Nov. 22, 1966  C. N. TRIPP  3,286,882
BOOSTER TANK SYSTEM
Filed Oct. 18, 1962  2 Sheets-Sheet 2

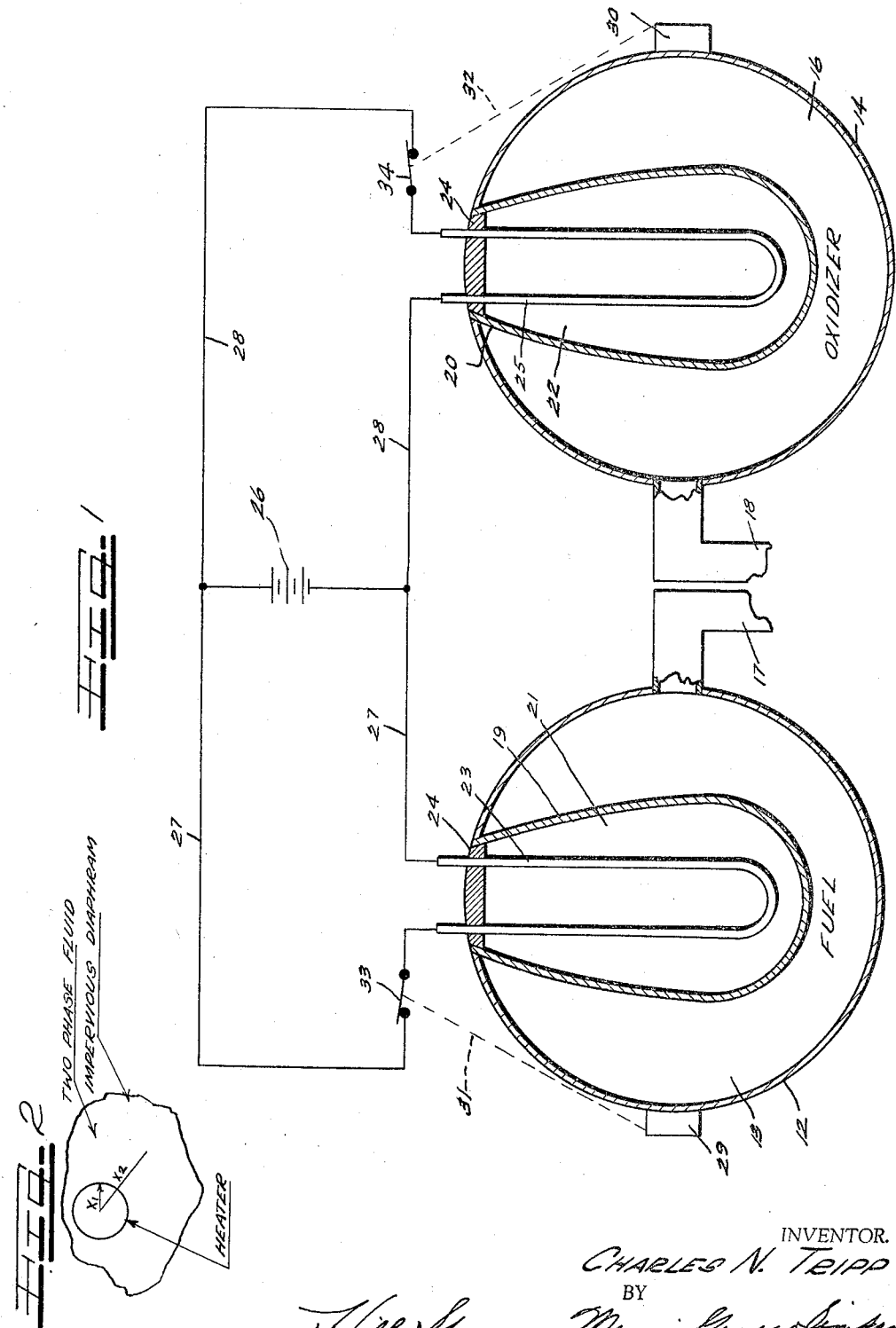

INVENTOR.
CHARLES N. TRIPP
BY
ATTORNEYS

3,286,882
BOOSTER TANK SYSTEM
Charles N. Tripp, Los Angeles, Calif.
Filed Oct. 18, 1962, Ser. No. 231,520
3 Claims. (Cl. 222—61)
(Granted to National Aeronautics and Space Administration under the provisions of 42 U.S.C. 2457 (a))

The present invention generally relates to a method and means for pressurizing a propellant tank and more particularly to a method and means of pressurizing a propellant tank with a two-phase fluid.

Propellant tanks have been pressurized by various means such as using auxiliary pressure tanks connected to or forming a part of the propellant tanks and using combustion gas products to pressurize the propellant tanks. These means of pressurizing propellant tanks required complex controls to maintain a constant fluid pressure supply to pressurize the propellant and also were relatively bulky and heavy. The complex controls of these pressurizing systems caused havoc with the preflight testing of the equipment as well as relatively frequent breakdown, while the weight of these systems reduced the effectiveness of the propellant.

The present invention, as hereinafter described, eliminates the detrimental aspects of these above described pressurizing systems by providing a relatively lightweight and simply controlled pressure system. My invention provides the propellant tank with an internal pressurization system that is controlled by simple pressure sensitive "on-off" control switches to regulate the pressure exerted on the propellant and also provides a pressure medium which does not require large and heavy storage chambers.

It is therefore an object of the present invention to provide an improved propellant tank pressurization system.

It is a further object of the present invention to provide a propellant tank pressurization system using a two-phase fluid to exert pressure on propellant within the propellant tank.

It is still another object of the present invention to provide a method of delivering propellant from a propellant tank by exerting pressure on the propellant from a gas-converted two-phase fluid contained within the propellant tank.

It is still another object of the present invention to provide a propellant tank with a gas convertible two-phase fluid therein and means to convert the two-phase fluid into its gaseous state and exert pressure of the propellant to force the propellant from the propellant tank.

Other and further objects of this invention will be apparent to those skilled in the art from the following detailed description of the annexed sheet of drawing which by way of preferred examples only illustrate two embodiments of the present invention.

On the drawings:

FIGURE 1 is a partial longitudinal cross-sectional view of the pressurizable propellant tank system of the present invention;

FIGURE 2 is a diagrammatic transverse cross-sectional view of a two-phase fluid expandable bag and immersed heater used in the present invention;

Figure 3:
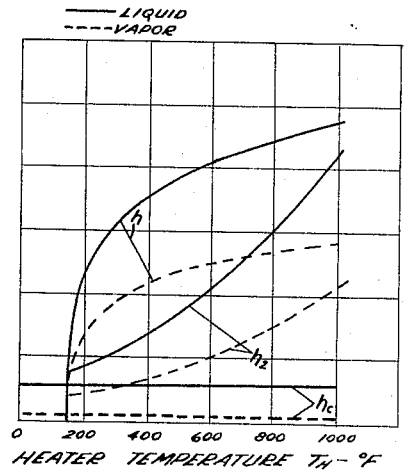
FIGURE 3 is a graph plot of heat transfer coefficients versus the temperature of the heater.

In accordance with this invention a booster rocket motor is delivered propellant from a pressurized propellant tank. These rocket motors are preferably of the chemical reacting type and are preferably fed with a hypergolic reacting fuel and an oxidizer. The rocket motor uses two similar pressurized tanks, one containing an oxidizer and the other containing a hypergolic fuel, which simultaneously deliver and impinge the fuel and oxidizer in the rocket motor combustion chamber. The fuel for the rocket motor is preferably hydrazine and mixtures of hydrazine and unsymmetrical dimethylhydrazine with the preferred fuel being a mixture of 50% hydrazine and 50% unsymmetrical dimethylhydrazine. The oxidizer is an oxidizer such as red fuming nitric acid or nitrogen tetroxide.

Referring to FIGURE 1 there is illustrated a pressurized fuel and oxidizer tank system of the present invention. Although the system is hereinafter particularly described in connection with hypergolic fuels, it is understood that the same structures and principles may be utilized for other purposes, such as expelling monopropellant into an ignition chamber.

The pressurized tank system 11 has a spherical fuel storage tank 12 containing a hypergolic fuel 13 and a spherical oxidizer storage tank 14 containing an oxidizer 16. The tanks may be any shape but the spherical tank allows the storage of the maximum amount of fuel for the minimum tank weight and also occupies, the least amount of space.

The fuel tank 12 has a fuel delivery conduit 17 attached thereto that communicates with the fuel 13 and delivers the fuel 13 to the motor combustion chamber (not shown). A similar oxidizer delivery conduit 18 is attached to the oxidizer tank 14 and communicates with the interior thereof to deliver oxidizer to the combustion chamber.

The fuel and oxidizer tanks are equipped with respective impervious flexible diaphragms 19 and 20 containing two-phase fluids 21 and 22, respectively. Immersed in the two-phase fluids 21 and 22 are electric heaters 23 and 25, respectively. The heaters and the flexible diaphragms are attached to the interior of their respective tanks 12 and 14 by nickel brazing at 24 to prevent fluid from escaping from the fluid-tight impervious diaphragms.

The size of the heaters depends on the heat required to be generated in order to vaporize the two-phase fluid. The heaters heat the two-phase fluid to vaporize the two-phase fluid and expand the flexible diaphragms. Expansion of the flexible diaphragms exert pressure on the fuel and oxidizer to pressurize the fuel and oxidizer into their respective delivery conduits 17 and 18. The fuel and oxidizer are delivered to the rocket motor combustion chamber in impinging relationship and at their correct proportions. The preferred ratio of oxidizer to fuel, when using nitrogen tetroxide as the oxidizer and the mixture of 50% unsymmetrical dimethylhydrazine and 50% hydrazine as the fuel, is 1.3 to 2.0 parts by weight of oxidizer to one part by weight of fuel.

It is of course understood that in order to obtain the ratio of fuel to oxidizer in the engine combustion chamber, the size of the oxygen tank and the amount of two-phase fluid in the oxygen tank may be greater than the size of the fuel tank and amount of two-phase fluid in the fuel tank.

The electric heaters 23 and 25 are connected to a battery 26 through lines 27 and 28. It will be understood that the particular electrical supply hook-up for the heaters may vary in accordance to type of the heaters and the amount of heat that has to be generated. In certain circumstances it may be preferable to use a separate battery for each tank or even single line connections to both heaters from a single battery. The present electrical circuits for both heaters 23 and 25 are for illustrative purposes only.

To have a constant flow rate of fuel and oxidizer through their respective delivery conduits 17 and 18, a fuel pressure sensitive switch 29 and an oxidizer pressure sensitive switch 30 are attached to their respective tanks 12 and 14. The pressure sensitive switches are connected to the battery circuit lines 27 and 28 through connections 31 and 32 at fuel circuit contact 33 and oxidizer circuit contact 34. These connections are simple on-off pressure sensitive switch connections that either complete or break the circuit connection between the generator and the respective heaters. The pressure sensitive switches 29 and 30 are preferably operated independently of each other. However, in certain circumstances their dependent operation may be desired and their dependent operation is brought about by connections well known to the artisan.

tank drops below 235 p.s.i.a., the fuel tank pressure switch will complete the fuel tank heater circuit and turn on the fuel tank heater to vaporize more fuel tank two-phase liquid. This also occurs when the oxidizer pressure in the oxidizer tank decreases below 235 p.s.i.a. The oxidizer tank pressure switch will complete the oxidizer tank heater circuit to vaporize the oxidizer tank two-phase fluid 22 and expand the impervious bag 20.

The fuel pressure switch 29 and the oxidizer pressure switch 30 operate independently of one another and are only dependent upon the pressure conditions in their respective fuel and oxidizer tanks. It is preferable to use the same two-phase fluid in both the impervious bag 19 and the impervious bag 20. Freon-12, chemically known as dichlorodifluoromethane, was chosen as the preferred two-phase fluid because of its saturation pressure-temperature point at 235 p.s.i.a. and 145° F. The impervious bags may contain any two-phase fluid having a desirable saturation pressure-temperature point and capable of fulfilling its required function in the present invention. Also, the fuel bag 19 does not necessarily have to contain the same two-phase fluid as the oxidizer bag 20 but may contain another desirable two-phase fluid.

The size of the fuel tank and fuel bag vary from the size of the oxidizer tank and oxidizer bag. Typical relative sizes shown for two runs are illustrated by the following table.

TABLE I.—NUMERICAL PARAMETERS

| | Run | | | |
|---|---|---|---|---|
| | 1 | | 2 | |
| | Fluid | | | |
| | Fuel, .5 UDMH +.5 $N_2H_4$ | Ox., $N_2O_4$ | Fuel, .5 UDMH +.5 $N_2H_2$ | Ox., $N_2O_4$ |
| Propellant wt., lb | 38.5 | 77.0 | 114.7 | 229.4 |
| Density, sp. gr | .89 | 1.45 | .89 | 1.45 |
| Lb./in.³ | .0321 | .0523 | .0321 | .0523 |
| Tank Volume, in.³ | 1200 | 1470 | 3570 | 4380 |
| Dia., in | 13.18 | 14.10 | 18.96 | 20.30 |
| Freon Density=.1663 ft.³/lb | | | | |
| (Sat. Vapor)=.00348 lb./in.³ | | | | |
| Required $W_f$ to Fill Volume: | | | | |
| At 145° F., 235 p.s.i.a., lb | 4.18 | 5.11 | 2.43 | 15.24 |
| $W_f$=Weight of Freon-12 | | | | |
| Propellant Flow Rate Into the Combustion Chamber, lb./sec | .120 | .240 | .667 | 1.333 |
| V, in.³/sec | 3.74 | 4.59 | 20.8 | 25.5 |

The pressure sensitive switches preferably operate in response to the fuel and oxidizer pressures and preferably have a 5 p.s.i.a. deadband. In the case of the same two-phase fluid in both tanks, such as Freon-12 which has a saturation pressure-temperature point at 235 p.s.i.a. and 145° F., the pressure sensitive switches are set at 235 p.s.i.a. The switches are set to maintain a constant pressure on the fuel and oxidizer.

In operation, the fuel and oxidizer are stored at pressures below 235 p.s.i.a. Therefore, when the battery 26 is turned on, the circuits 27 and 28 are completed through contacts 33 and 34. The heaters 23 and 25 transfer heat to their respective two-phase fluids 21 and 22. The two-phase fluids vaporize and expand their respective fluid tight diaphragms 19 and 20. The expanding diaphragms exert pressure on the fuel and oxidizer within the tanks. When the fuel tank 12 pressure exceeds 240 p.s.i.a., the pressure switch having a 5 p.s.i.a. deadband, the fuel tank pressure switch 29 will break the heater circuit at connection 33 to shut-off the heater and stop the vaporization of the fuel tank two-phase fluid 21. Likewise, when the oxidizer tank pressure exceeds 240 p.s.i.a., the oxidizer tank pressure switch will break the oxidizer heater circuit at oxidizer circuit connection 34 and shut off the oxidizer tank heater 25. When the pressure of fuel in the fuel The area and heat transfer coefficients for the heaters are calculated in accordance to the following equations and assumptions when using Freon-12 as the two-phase fluid and referring to FIGURE 2.

Freon-12 properties:

Assume Freon design point of: Pressure=235 p.s.i.a.; temperature=145° F.

| Properties | Sat. Liquid | Sat. Vapor |
|---|---|---|
| Viscosity, lb./hr. ft | 0.53 | 0.013 |
| Density, lb./ft.³ | 75.0 | 5.0 |
| Conductivity, B.t.u./hr. ft.² °F./ft | 0.043 | 0.0064 |
| Specific Heat, B.t.u./16 °F | 0.240 | 0.145 |

Radiation: Assume the heat transfer from the heater to diaphram and diaphram to Freon can be neglected—Heat transfer between heater and Freon $$Q_{H-F} = A_H \sigma (T_H^4 - T_F^4) \frac{1}{1/E_H + 1/E_F - 1} \quad (5)$$

Factoring $$Q_{H-F} = A_H \sigma \frac{(T_H - T_F)(T_H^3 + T_F T_H^2 + T_F^2 T_H + T_F^3)}{1/E_H + 1/E_F - 1} \quad (6)$$

and rearranging $$h_R = \frac{Q_{H-F}}{A(T_H-T_F)} = \frac{\sigma(T_H^3 + T_F T_H^2 + T_F^2 T_H + T_F^3)}{1/E_H + 1/E_F - 1} \quad (7)$$

Scope of variables:

| $E_H$ | $C_F$ (Assumed) | $h_R$ |
|---|---|---|
| .072 (Commercial Copper) | .50 (Sat. Vapor) | $1.16 \times 10^{-10} (T_H^3 + T_F T_H^2 + T_F^2 T_H + T_F^3)$ |
| Do | 1.0 (Liquid) | $1.23 \times 10^{-10} (T_H^3 + T_F T_H^2 + T_F^2 T_H + T_F^3)$ |
| .95 (Commercial Steel) | .50 (Vapor) | $8.35 \times 10^{-10} (T_H^3 + T_F T_H^2 + T_F^2 T_H + T_F^3)$ |
| Do | 1.0 (Liquid) | $16.3 \times 10^{-10} (T_H^3 + T_F T_H^2 + T_F^2 T_H + T_F^3)$ |

Where T=° R.

Conduction: Conduction through Freon from heater surface (radius $X_1$) to point in Freon (radius $X_2$) is found from the following equation.

$$h_c = \frac{Q}{\Delta T A} = \frac{km}{\left(1 - \frac{X_1}{X_2}\right) X_1} \quad (8)$$

Assume conductivity constant. $\therefore km = K$
Scope of variable:

| $X_1$ | $X_2$ | $h_c$ |
|---|---|---|
| ½ inch | 1 inch (Sat. Vapor) | .307 |
| Do | 1 inch (Sat. Liquid) | 2.07 |
| Do | 6 inches (Sat. Vapor) | .162 |
| Do | 6 inches (Sat. Liquid) | 1.1 |

Convection:
A. Free convection—one "g"—

$$hv = \frac{.59 K_f}{L} \left[ \frac{L^3 P f^2 g \Delta T}{\mu_f^2} \left( \frac{C_p t_{\mu f}}{K_f} \right) \right]^{1/4} \quad (9)$$

Assume film properties as shown previously.
Scope of variables:

L: $h_v$
 1 inch (Sat. vapor) $\quad 1.1(T_H-T_F)^{1/4}$
 1 inch. (Sat. liquid) $\quad 1.8(T_H-T_F)^{1/4}$ B. Random convection—forced, one "g"—coefficient will be greater than that for liquid with free convection due to mixing and increased velocity over heater; order of two times greater is reasonable assumption.

Summary:

| $T_F$ | $T_H$ | $h_R(E_H=.95)$ | | $h_c(X_2=6$ inches$)$ | | $h_v$ | |
|---|---|---|---|---|---|---|---|
| | | Vap. | Liq. | Vap. | Liq. | Vap. | Liq. |
| 145° F | 300 | 1.1 | 2.1 | .16 | 1.1 | 3.8 | 6.3 |
| 145° F | 500 | 1.7 | 3.3 | .16 | 1.1 | 4.8 | 7.8 |
| 145° F | 1,000 | 4.3 | 8.4 | .16 | 1.1 | 5.8 | 9.6 |
| 145° F | 145 | .74 | 1.44 | .16 | 1.1 | 0 | 0 |

These values are plotted in FIG. 3
The heat input to the Freon changes the liquid properties according to the relationship $$Q = W_f \left( \mu + 144 \frac{P}{J} v \right) \text{ B.t.u./sec.} \quad (10)$$

Where $W_f$ = Wt. of Freon, lb.
$\mu$ = Internal energy of Freon, B.t.u./lb.
$P$ = Pressure, p.s.i.a.
$J$ = 778 ft. lb./B.t.u.

or $v$ = Specific volume, ft.$^3$/lb.

$$Q = W_F \mu + \frac{P}{12J} \dot{V} \text{ B.t.u./sec.} \quad (11)$$

$V$ = Bladder volume, in.$^3$

PROPERTIES OF FREON-12 AT SATURATION CONDITIONS

| T | °F | 130 | 140 | 145 | 150 | 160 | 170 |
|---|---|---|---|---|---|---|---|
| P | P.s.i.a | 195.5 | 221.3 | 235 | 249.6 | 279.8 | 312.8 |
| $h_f$ | B.t.u./lb | 38.553 | 41.162 | ------ | 43.850 | 46.633 | 49.529 |
| $h_g$ | B.t.u./lb | 89.321 | 89.967 | ------ | 90.534 | 91.006 | 91.357 |
| $h_{fg}$ | B.t.u./lb | 50.768 | 48.805 | ------ | 46.676 | 44.373 | 41.830 |
| $V_f$ | Ft.$^3$/lb | .013447 | .013746 | ------ | .014078 | 0.14449 | .014871 |
| $V_g$ | Ft.$^3$/lb | .20364 | .17799 | ------ | .15564 | .13604 | .11873 |
| $V_{fg}$ | Ft.$^3$/lb | .19019 | .16424 | ------ | .14156 | .12159 | .10386 |
| $\left.\frac{Pv}{J}\right)_f$ | B.t.u./lb | .487 | .564 | ------ | .650 | .749 | .861 |
| $\left.\frac{Pv}{J}\right)_{fg}$ | B.t.u./lb | 6.89 | 6.74 | ------ | 6.54 | 6.30 | 6.01 |
| $\mu_f$ | B.t.u./lb | 38.066 | 40.598 | ------ | 43.200 | 45.884 | 48.668 |
| $\mu_{fg}$ | B.t.u./lb | 43.88 | 42.07 | ------ | 40.14 | 38.07 | 35.82 |

Figure 4:
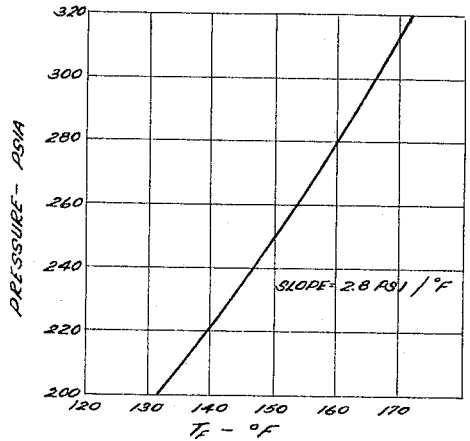
FIGURE 4 is a graph plotting dichlorodifluoromethane pressure versus temperature.
Figure 5:
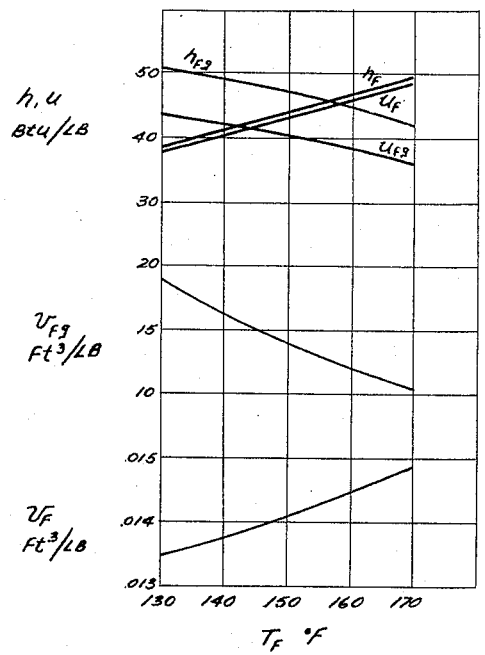
FIGURE 5 is a graph plotting dichlorodifluoromethane parameters versus temperature.

The curves in FIGS. 4 and 5 indicate that the parameters may be taken as linear functions of temperature or pressure around the 145° F., 235 p.s.i.a operating point. The slopes of interest are:

$$\frac{d\mu_f}{d_p} = \frac{2.602}{28.3} = .0920 \frac{\text{B.t.u./lb.}}{\text{p.s.i.}} \quad (12)$$

$$\frac{d\mu_{fg}}{d_p} = \frac{-1.93}{28.3} = -.0682 \frac{\text{B.t.u./lb.}}{\text{p.s.i.}} \quad (13)$$

$$\frac{dv_f}{d_p} = \frac{3.32}{28.3} \times 10^{-4} = .1173 \times 10^{-4} \frac{\text{ft.}^3/\text{lb.}}{\text{p.s.i.}} \quad (14)$$

$$\frac{dv_{fg}}{d_p} = \frac{2.268}{28.3} \times 10^{-2} = -.0802 \times 10^{-2} \frac{\text{ft.}^3/\text{lb.}}{\text{p.s.i.}} \quad (15)$$

$$\frac{dT_F}{d_p} = \frac{1}{2.8} = .357° \text{ F./p.s.i.} \quad (16)$$

The "Quality (fraction of vapor) of the 2-phase Freon is related to the properties by the equations $$x = \frac{\mu - \mu_f}{\mu_{fg}} \quad (17)$$

$$x = \frac{v - v_f}{v_{fg}} \quad (18)$$

Figure 6:
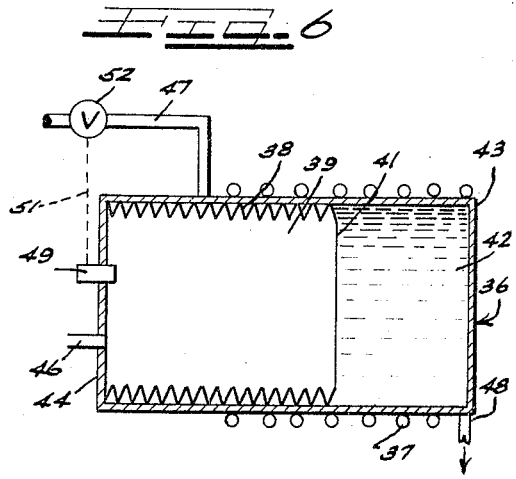
FIGURE 6 is a partial longitudinal cross-sectional view of another embodiment of a pressurizable propellant tank of the present invention.

Referring to FIGURE 6, there is illustrated another embodiment of the present invention to pressurize a propellant tank. Although only the fuel tank is illustrated in this embodiment it is understood that in the case of hypergolic fuels a similar pressurized tank may be connected to the system to feed oxidizer to a combustion chamber.

Illustrated in this embodiment of the present invention is a cylindrical fuel tank 36 having a brazed tube heat exchanger 37 on the entire periphery thereof. Welded to one end of the interior of the tank 36 is a stainless steel bellows 38 defining a fuel storage chamber 39. The bellows has an outer diameter approximately equal to the inner diameter of the tank 36 and the bellows only occupies a portion of the tank volume. The bellows has a flat circular piston-like end 41 that defines a two-phase fluid chamber 42 with the end wall 43 of the tank 36. The other end of the bellows is the front wall 44 of the tank 36.

Extending from the front wall 44 and communicating with the interior of the fuel chamber 39 is a fuel delivery conduit 46. The fuel delivery conduit delivers fuel to an engine ignition chamber (not shown) where it is ignited. Fuel is pressurized and delivered to the conduit 46 by placing a two-phase fluid in the chamber 42 and heating the two-phase fluid. When the two-phase fluid is heated, it vaporizes and exerts a force on the bellows rear wall 41 to collapse the bellows and force the fuel through the conduit 46.

The two-phase fluid is heated by a tubular heat exchanger 37 brazed to the periphery of the tank 36. The heat exchanger has an inlet conduit 47 that directs a heated fluid into the heat exchanger to be circulated therethrough and an outlet conduit 48 that directs the heat exchanger fluid to a radiator (not shown). To control the pressure of the fuel in the fuel chamber 39, a fuel pressure switch 49 is connected to the front fuel chamber wall 44 and communicates with the interior of the fuel chamber. The pressure switch is connected through a connecting line 51 to an on-off valve 52 that controls the incoming heat exchanger fluid flow in the heat exchanger inlet conduit 47. The valve 52 is opened and closed, to control the pressure on the fuel, in a similar manner as explained in regards to the embodiment of FIGURE 1.

The heat exchanger fluid may be from hot gases tapped from the combustion chamber or nozzle of a rocket motor; from an auxiliary heater, or any desirable fluid heating means. The exiting heat exchanger fluid may be delivered to the walls of the rocket motor nozzle to cool the nozzle and then be recirculated through the heat exchanger; to a radiator or condenser before being delivered to nozzle walls or auxiliary heater; or any desirable heat exchanger connection known to those skilled in the art to supply and circulate heat through the heat exchanger 37.

Although it has not been shown, it is understood that the fuel and oxidizer may be stored in their respective tanks by having a valve means or even a pressure frangible disc to prevent the stored fuel or oxidizer from flowing out of their delivery conduits prematurely. Also, the bellows is used to form a double hermetically sealed chamber to separate the Freon-12 from the fuel and if desired, the rear wall 41 may have a circular seal on the ends thereof to prevent the expanding Freon-12 from flowing into the space between the sides of the bellow and the inner surface of the tank.

Although minor modifications might be suggested by those skilled in the art, it should be understood that I wish to embody within the scope of the patent warranted hereon, all such embodiments as reasonably and properly come within the scope of my contribution to the art.

I claim as my invention:
1. A fluid delivering device which comprises:
   a tank comprising two variable volume chambers, one of said chambers being adapted to contain fuel and having an outlet, the second of said chambers being fully sealed and filled with a heat-expandable material,
   heater means operatively connected with the tank to heat and expand said material,
   said second chamber increasing in volume upon the heating and expansion of said material therein, and said first chamber proportionally decreasing in volume whereby said fuel is forced therefrom,
   and pressure responsive means operatively connected to said heater means and directly referenced to the pressure on the fuel in said first chamber to control actuation of the heater means to control the expansion of the expandable material and thereby maintain a predetermined pressure on the fluid chamber.
2. A fluid delivering device as defined in claim 1, in which said tank is spherical, said one chamber being defined by the tank, said second chamber comprising an expandable bag of normally substantially smaller volume than the interior of the tank but located within the tank and attached thereto in fully sealed relation, said heater comprising an electrical resistance heater supported by the tank but extending into the interior of said bag, and means for operating said heater including a source of electricity and a switch, said pressure responsive means being mounted on said tank and controlling said switch.
3. A fluid delivering device as defined in claim 1 in which said tank is cylindrical, and said heater means comprise a heating coil wrapped in direct heat transfer relation about the outside of said second chamber of the tank, with the coil having a control valve in control of circulation through the coil and said pressure responsive means being in control of said valve.

References Cited by the Examiner
UNITED STATES PATENTS

| | | | |
|---|---|---|---|
| 776,106 | 11/1904 | Beurrier. | |
| 2,074,959 | 3/1937 | Guest. | |
| 2,815,152 | 12/1957 | Mills | 222—386.5 |
| 2,816,419 | 12/1957 | Mueller | 222—146 X |
| 2,836,963 | 6/1958 | Fox | 222—386.5 X |
| 3,097,766 | 7/1963 | Biehl et al. | 222—386.5 X |

ROBERT B. REEVES, *Primary Examiner.*

LOUIS J. DEMBO, RAPHAEL M. LUPO, *Examiners.*

W. SOBIN, *Assistant Examiner.*